No. 677,893. Patented July 9, 1901.
J. A. MAIGNEN.
FILTER.
(Application filed Apr. 26, 1898.)

(No Model.)

WITNESSES:
E. L. Fullerton.
Clifton C. Hallowell.

INVENTOR:
JEAN A. MAIGNEN,
by Arthur E. Paige
Atty.

United States Patent Office.

JEAN AUGUSTE MAIGNEN, OF PHILADELPHIA, PENNSYLVANIA.

FILTER.

SPECIFICATION forming part of Letters Patent No. 677,893, dated July 9, 1901.

Application filed April 26, 1898. Serial No. 678,851. (No model.)

*To all whom it may concern:*

Be it known that I, JEAN AUGUSTE MAIGNEN, of Philadelphia, in the State of Pennsylvania, have invented certain new and useful Improvements in Filters, whereof the following is a specification, reference being had to the accompanying drawings.

My invention relates to filters of hollow form wherein the water in process of filtration passes from the exterior to the interior of the filter-body, the latter being provided with an outlet for the filtrate.

My invention comprises a filter-body of permeable material, a filtrate-outlet from said body, a covering for said body of asbestos cloth or analogous material, and an outer covering of fibrous or powdered filtering media, such as asbestos-pulp or powdered charcoal or analogous material.

Figure 1:
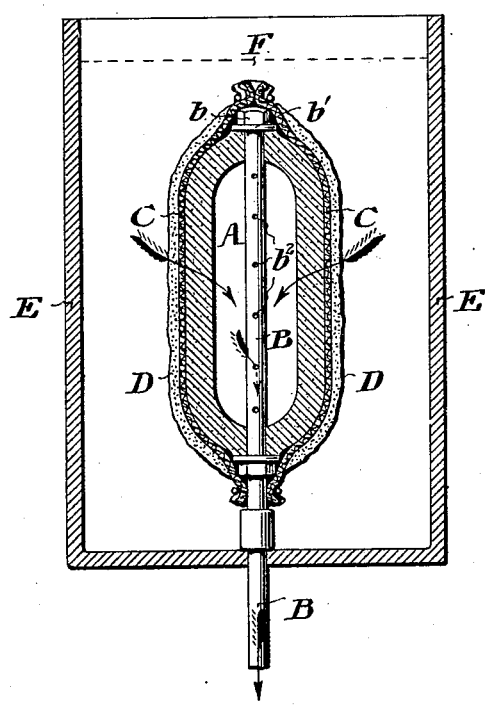
Figure 2:
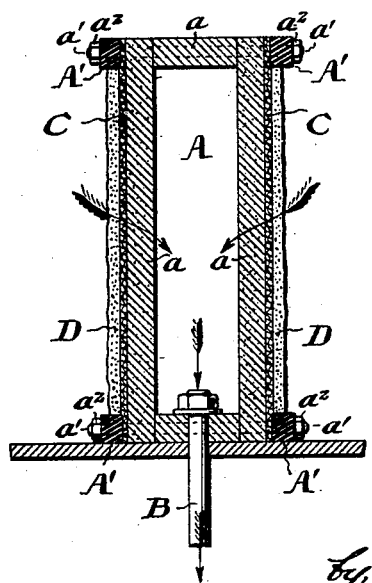

In the accompanying drawings, Figure 1 is a central vertical section through a convenient embodiment of my invention. Fig. 2 is a sectional view of a modified form of my invention.

In Fig. 1 the filter core or body A consists of an integrally-constructed hollow shell, and the filtrate-outlet pipe B is extended through said shell and secured in proper relation therewith by the nuts $b$ and washers $b'$. Said pipe B communicates with the interior of the body A by perforations $b^2$. The shell A is covered with asbestos cloth or analogous material, as indicated at C, and upon the exterior of said covering C is a second covering D, of fine filtering media, fibrous or powdered. The filter is supported upon the pipe B within the tank E, which contains the water F, and the latter in process of filtration passes from said tank to the interior of the filter-body A and out through the pipe B.

The body A may be composed of any material having a filtering capacity—such as porous porcelain, natural or artificial porous stone, porous stoneware, or other porous ceramic, porous plastic charcoal, or the like. For comparatively small filters the body A may be conveniently formed in a single shell, as indicated in Fig. 1. It is obvious, however, that the interior of a body thus formed is not conveniently accessible, and it is therefore preferable for some purposes to form said body of separable slabs or sections.

As shown in Fig. 2, the body A is composed of slabs $a\ a$, provided with the coverings C and D. In this form of my invention the several parts of the body A are assembled in normally fixed relation within suitable frames A', connected by bolts $a'$ and nuts $a^2$.

It is to be understood that in both of the forms of my invention which I have illustrated the water to be filtered passes, first, through the covering; D, second, through the covering C, and, third, through the side walls of the body A to the interior thereof, the filtrate being discharged in any convenient manner from the interior of said body A.

I do not desire to limit myself to the particular details of construction which I have illustrated, as it is obvious that various modifications may be made therein without departing from the spirit of my invention. Moreover, it is to be understood that I have used the term "water" herein in a descriptive and not in a restrictive sense, as it is obvious that the precise nature of the liquid filtered is not of the essence of my invention.

I claim—

A filter comprising a body composed of material having a filtering capacity; a covering for said body of asbestos cloth or analogous material; a filtrate-outlet communicating with said filtering-body, and an outer covering of fibrous or powdered filtering media, substantially as set forth.

JEAN AUGUSTE MAIGNEN.

Witnesses:
WM. C. WIEDERSHEIM,
E. HAYWARD FAIRBANKS.